US010201822B2

(12) United States Patent
Zhu

(10) Patent No.: US 10,201,822 B2
(45) Date of Patent: Feb. 12, 2019

(54) CONTROLLABLE VARIABLE SPRAY GUN FOR A CENTRAL-PIVOT SPRINKLER AND A CENTRAL-PIVOT SPRINKLER

(71) Applicant: Suozhu Zhu, Hebei (CN)

(72) Inventor: Suozhu Zhu, Hebei (CN)

( * ) Notice: Subject to any disclaimer, the term of this patent is extended or adjusted under 35 U.S.C. 154(b) by 0 days.

(21) Appl. No.: 15/576,717

(22) PCT Filed: May 26, 2016

(86) PCT No.: PCT/CN2016/083480
§ 371 (c)(1),
(2) Date: Nov. 23, 2017

(87) PCT Pub. No.: WO2016/188451
PCT Pub. Date: Dec. 1, 2016

(65) Prior Publication Data
US 2018/0169684 A1    Jun. 21, 2018

(30) Foreign Application Priority Data
May 26, 2015   (CN) ..................... 2015 2 0344396 U

(51) Int. Cl.
*B05B 12/16*     (2018.01)
*A01G 25/00*     (2006.01)
(Continued)

(52) U.S. Cl.
CPC ............. *B05B 12/16* (2018.02); *A01G 25/00* (2013.01); *A01G 25/092* (2013.01); *A01G 25/16* (2013.01);
(Continued)

(58) Field of Classification Search
CPC .. B05B 12/16; B05B 3/00; B05B 3/12; B05B 9/01; A01G 25/092; A01G 25/16; A01G 25/00
(Continued)

(56) References Cited

U.S. PATENT DOCUMENTS 3,352,493 A * 11/1967 Curtis .................. A01G 25/092
239/729
3,902,668 A    9/1975 Daugherty et al.
(Continued)

FOREIGN PATENT DOCUMENTS

CN    1308849 A    8/2001
CN    2493025 Y    5/2002
(Continued)

*Primary Examiner* — Steven J Ganey
(74) *Attorney, Agent, or Firm* — Novick, Kim & Lee, PLLC; Allen Xue

(57) ABSTRACT

The central-pivot sprinkler contains a central-pivot sprinkler and a controllable variable spray gun. The controllable variable spray gun has a spray gun main body (2), a booster pump (7), and a spray gun connecting pipe (16). A water inlet of the booster pump (7) is communicated with a sprinkler pipe (15) of the central-pivot sprinkler. A water outlet of the booster pump (7) is connected to a water inlet of the spray gun main body (2) by means of the spray gun connecting pipe (16). The forepart of the spray gun main body (2) is provided with a spray nozzle (12). The tail portion of the spray gun main body (2) can be mounted at the end of a crossing-body (1) of the central-pivot sprinkler by means of a spray gun horizontal-rotation mechanism.

11 Claims, 3 Drawing Sheets

(51) Int. Cl.
*B05B 3/12* (2006.01)
*B05B 9/01* (2006.01)
*A01G 25/09* (2006.01)
*A01G 25/16* (2006.01)
*B05B 3/00* (2006.01)

(52) U.S. Cl.
CPC ............... *B05B 3/00* (2013.01); *B05B 3/12* (2013.01); *B05B 9/01* (2013.01); *Y02A 40/237* (2018.01)

(58) Field of Classification Search
USPC ......... 239/160, 164, 587.1, 587.2, 726, 728, 239/729
See application file for complete search history.

(56) References Cited

U.S. PATENT DOCUMENTS

| | | |
|---|---|---|
| 3,921,908 A | 11/1975 | Zimmerer |
| 4,277,023 A | 7/1981 | Anderson et al. |
| 4,368,848 A * | 1/1983 | Emrich ................ A01G 25/092 239/729 |
| 4,534,510 A | 8/1985 | Rinkewich |

FOREIGN PATENT DOCUMENTS

| | | |
|---|---|---|
| CN | 204157394 U | 2/2015 |
| CN | 104841585 A | 8/2015 |
| CN | 204656783 U | 9/2015 |

* cited by examiner

CONTROLLABLE VARIABLE SPRAY GUN FOR A CENTRAL-PIVOT SPRINKLER AND A CENTRAL-PIVOT SPRINKLER

FIELD

This invention relates to a spray gun used for irrigation, and more specifically, to a controllable variable spray gun used for central-pivot sprinkler.

BACKGROUND

Currently central-pivot sprinkler has been widely used in many countries and regions. Compared with other sprinklers, this equipment has the advantages of high degree of automation, large control area, strong adaptability to crops and topography, good spraying uniformity, water-saving and energy-saving, etc, but at the same time, it also appears obvious defects, namely, four land corners of the square land parcel cannot be irrigated, resulting in low land utilization. All of the existing solutions to the problem of missing land corners in irrigation have appeared various disadvantages which failed to well solve the problem of missing land corners in irrigation existing in the central-pivot sprinkler.

The above information disclosed in the background technology section is only used to strengthen understanding of the background of the present disclosure. Therefore it may include information that does not constitute the prior art known to an ordinary skilled person in the art.

SUMMARY

The technical problem to be solved by this invention is to provide a controllable variable spray gun and central-pivot sprinkler used for central-pivot sprinkler. With the central-pivot sprinkler, land corners of a square land parcel can be evenly irrigated.

In order to solve the above technical problem, the technical solution adopted by this invention is as follows.

In accordance with one aspect of this invention, there is provided a controllable variable spray gun used for a central-pivot sprinkler, comprising a spray gun main body, a booster pump and a spray gun connecting pipe; the water inlet of the booster pump is connected with the sprinkler pipeline of the central-pivot sprinkler and the water outlet of the booster pump is connected with the water inlet of the spray gun main body via the spray gun connecting pipe; the forepart of the spray gun main body is provided with a nozzle and the tail portion of the spray gun main body is installed on the end of the central-pivot sprinkler crossing-body via a spray gun horizontal-rotation mechanism.

In accordance with an embodiment of this invention, the spray gun main body is arranged to be upward tilted and the nozzle faces to the outward side of the sprinkler crossing-body.

In accordance with an embodiment of this invention, the spray gun horizontal-rotation mechanism comprises a hollow base, a drive output, a worm, a spray gun rotating motor and a standpipe; the base is fixed on the water outlet of the spray gun connecting pipe and the two are seamlessly connected, the standpipe is arranged into the base, and the upper port of the standpipe is connected with the water inlet of the spray gun main body; the drive output is arranged between the standpipe and the base, and the outer wall of the standpipe and the inner wall of the drive output are fixedly connected, the drive output engages the worm via a pass groove arranged on the wall of the base and the worm is fixedly connected with the output shaft of the spray gun rotating motor.

In accordance with an embodiment of this invention, the tail portion of the spray gun main body is fixedly connected with a spray gun variable cross-section drive motor, the output shaft of the spray gun variable cross-section drive motor is fixedly connected with the tail portion of the variable section adjusting lever running through the center of the spray gun main body, the head of the variable cross-section adjusting lever is of a tapering cone and the head of the cone is inserted into the nozzle.

In accordance with an embodiment of this invention, the upper side of the tail portion of the spray gun main body is fixedly connected with a water allocation lever drive motor, the output shaft of the water allocation lever drive motor is fixedly connected with the tail portion of a water allocation lever arranged on the upper side of the spray gun main body and the forepart of the water allocation lever is arranged with a water allocation slice facing the nozzle.

In accordance with one aspect of this invention, there is provided a central-pivot sprinkler comprising a central pivot and a sprinkler crossing-body one end of which can be reelingly installed on the center pivot. The central-pivot sprinkler further comprises the controllable variable spray gun in accordance with this invention, and the controllable variable spray gun is installed on the other end of the sprinkler crossing-body.

In accordance with an embodiment of this invention, a control system is further comprised. The control system issues commands to the controllable variable spray gun of the central-pivot sprinkler based on a time signal and a position signal of the sprinkler crossing-body to cause the spray gun variable cross-section drive motor and the spray gun rotating motor to spray out required amount of water in a specified area.

In accordance with an embodiment of this invention, the angle of the sprinkler crossing-body 1 is 0° when the sprinkler crossing-body is vertical with any border line of a square land parcel, and the angle between the spray gun main body and the sprinkler crossing-body gradually changes from 90° to 180° when the sprinkler crossing-body's angle changes from 0° to 90°; the angle between the spray gun main body and the sprinkler crossing-body gradually changes from 180° to 90° when the sprinkler crossing-body's angle changes from 180° to 90°.

In accordance with an embodiment of this invention, the spray gun variable cross-section drive motor adjusts the nozzle's cross-sectional area for gradually increasing from 0 to the maximum area of the pre-installed nozzle when the sprinkler crossing-body changes from 0° to 90°; the spray gun variable cross-section drive motor adjusts the nozzle's cross-sectional area for gradually decreasing from the nozzle's maximum cross-sectional area to 0 when the sprinkler crossing-body changes from 90° to 180°.

The beneficial effects of adopting the above technical solutions lie in as follows.

This inventive device, installed on the tail end of the central-pivot sprinkler, automatically operates synchronously along with the operation of the sprinkler. When the central-pivot sprinkler operates and arrives to different positions, the spraying angle of the spray gun main body can be automatically adjusted by the preset program, so that four land corner areas of the square land parcel which the sprinkler's irrigation is missed can be evenly irrigated, thereby improving the land utilization without affecting physiognomy surrounding the land parcel.

This invention achieves the purpose of adjusting spraying area and flow amount by adjusting the cross-sectional area of the nozzle and the spay flow's horizontal included angle with the sprinkler pipeline, resulting in high uniformity of irrigation, reduced material cost and operating cost, saved man power and material resources and an increased irrigation area by 16% in square land parcel by the central-pivot sprinkler.

The preferred embodiments are set forth below with references to the accompanying drawings. This invention's above and other purposes, features and advantages will become more apparent.

Figure 1:
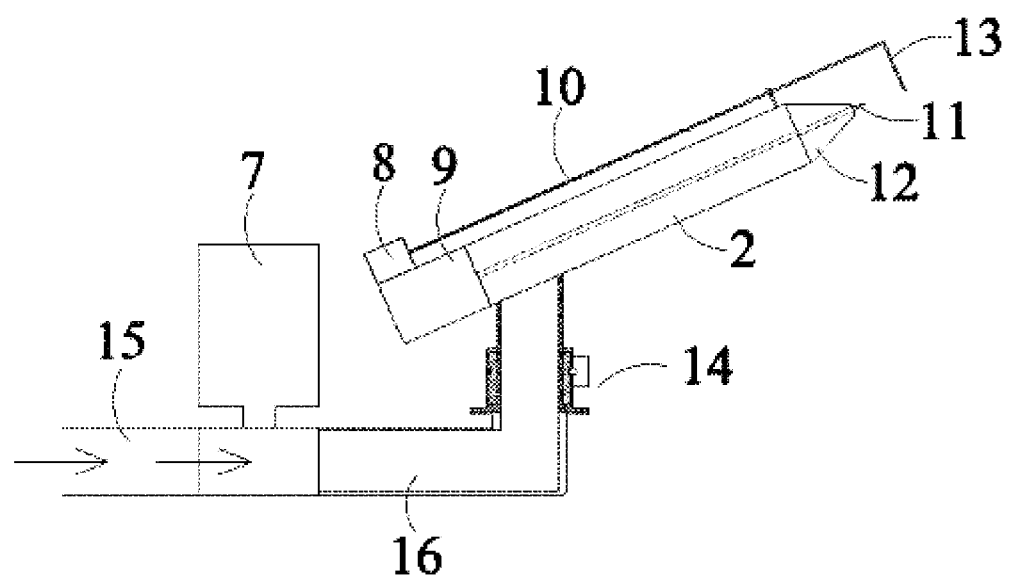
FIG. 1 is a structural schematic diagram of a controllable variable spray gun for a central-pivot sprinkler in this invention.

In the figures: 1. Sprinkler Crossing-body; 2. Spray Gun Main Body; 3. Central Pivot; 4. Irrigation Area of a Central-pivot Sprinkler; 5. Irrigation Area of a Controllable Variable Spray Gun; 6. Missing Area in Irrigation; 7. Booster Pump; 8. Water allocation Lever Drive Motor; 9. Spray Gun Variable Cross-section Drive Motor; 10. Water Allocation Lever; 11. Variable Cross-section Adjusting Lever; 12. Nozzle; 13. Water Allocation Slice; 14-1. Standpipe; 14-2. Spray Gun Rotating Motor; 14-3. Worm; 14-4. Worm Wheel; 14-5. Base; 15. Sprinkler Pipeline; 16. Spray Gun Connecting Pipe.

DETAILED DESCRIPTION OF EMBODIMENTS

Example embodiments will now be described in detail with reference to the appended drawings. However, the example embodiments can be implemented in many forms and it should not be understood to be limited to the manner of implementation described here. On the contrary, these embodiments are provided to make this disclosure full and complete and to comprehensively convey the idea of the example embodiments to the skilled person in the art. In the drawings like reference numerals are used to designate like or equivalent elements, detailed description will be therefore omitted.

As shown in FIG. 1, this invention discloses a controllable variable spray gun used for a central-pivot sprinkler, comprising a spray gun main body 2, a booster pump 7 and a spray gun connecting pipe 16. The water inlet of the booster pump 7 is connected to a sprinkler pipeline 15 of the central-pivot sprinkler, and the water outlet of the booster pump 7 is connected to the water inlet of the spray gun main body 2 via the spray gun connecting pipe 16. The spray gun main body 2 is upward tilted, the forepart of which is provided with a nozzle 12. The nozzle 12 faces to the outward side of the sprinkler crossing-body 1. The tail portion of the spray gun main body 2 is installed on the end of the central-pivot sprinkler crossing-body 1 via a spray gun horizontal-rotation mechanism. The horizontal rotation of the spray gun main body 2 can be achieved through the spray gun horizontal-rotation mechanism.

The booster pump 7 pressurizes the water flow in the sprinkler pipe 15 on the end of the sprinkler crossing-body 1 to a required water pressure so as to supply spray gun main body 2 with water, thereby the nozzle 12 sprays for irrigation. The tail portion of the spray gun main body 2 is fixedly provided with a spray gun variable cross-section drive motor 9, the output shaft of the spray gun variable cross-section drive motor 9 is fixedly connected with the tail portion of the variable cross-section adjusting lever 11 which goes through the center of the spray gun main body 2. The head of the variable section adjusting lever 11 is of a tapering cone and the head of the cone is inserted into the nozzle 12.

The spray gun variable cross-section drive motor 9 adjusts the range and flow of the spray gun. With the spray gun variable cross-section drive motor 9 driving variable cross-section adjustment lever 11, the purpose of changing the size of cross-sectional area of the water outlet of the nozzle 12 is achieved. The water allocation lever drive motor 8 is fixed on the upper side of the tail portion of the spray gun main body 2, and the output shaft of the water allocation lever drive motor 8 is fixedly connected with the tail portion of the water allocation lever 10 which is set on the upper side of the spray gun main body 2. The forepart of the water allocation lever 10 is provided with a water allocation slice 13 facing the nozzle 12 to ensure the uniformity of irrigation within the irrigation area.

Figure 2:
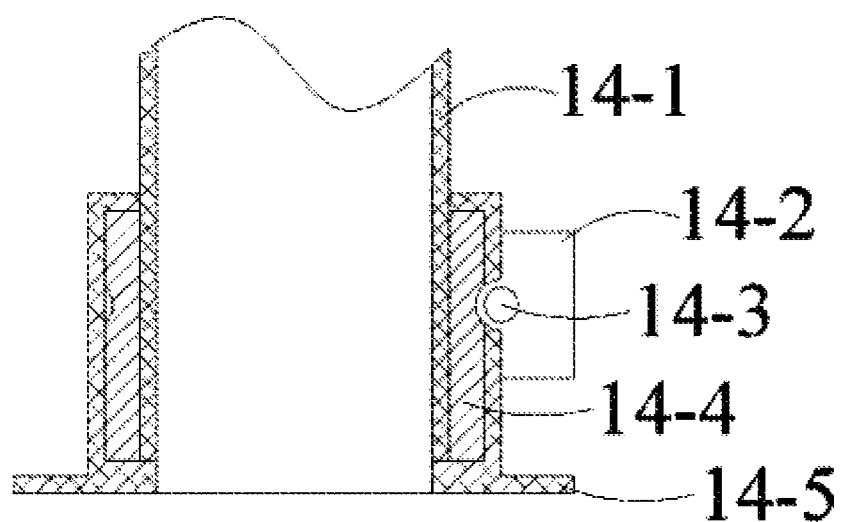
FIG. 2 is a structural schematic diagram of a horizontal-rotation mechanism in a controllable variable spray gun for a central-pivot sprinkler in this invention.

As shown in FIG. 2, the spray gun horizontal-rotation mechanism 14 of this invention comprises a hollow base 14-5, a worm wheel 14-4, a worm 14-3, a spray gun rotating motor 14-2 and a standpipe 14-1. The spray gun rotating motor 14-2 controls the spraying direction of the spray gun, the base 14-5 is fixed on the water outlet of the spray gun connecting pipe 16 and they are seamlessly connected. The standpipe 14-1 goes in the base 14-5, and the upper port of the standpipe 14-1 is connected with the water inlet of the spray gun main body 2. The worm wheel 14-4 is arranged between the standpipe 14-1 and the base 14-5, and the outer wall of the standpipe 14-1 is fixedly connected with the inner wall of the turbine 14-4. The worm wheel 14-4 engages the worm 14-3 via a pass groove arranged on the wall of the base 14-5. The worm 14-3 is fixedly connected with the output shaft of the spray gun rotating motor 14-2.

Figure 3:
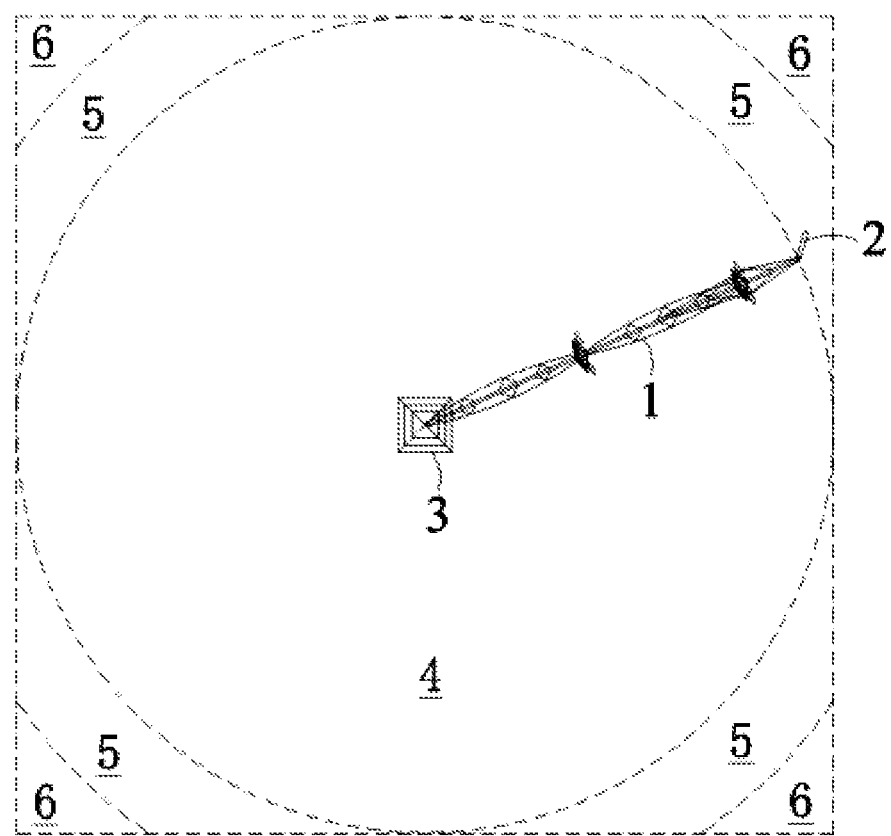
FIG. 3 is an example application diagram of this invention.

In FIG. 3, the center pivot 3 of the central-pivot sprinkler is immobilized. The sprinkler crossing-body 1 takes the center pivot 3 as the center of the circle for circumferential motion, and only the circular Area 4 in the square land parcel can be irrigated. The spray gun main body 2 makes appropriate actions along with the motions of the sprinkler crossing-body 1, and Area 5 can be irrigated. Area 6 is the area where the range of the spray gun is not covered. Assume that the side length of the square land parcel is 580 m, the sprinkler crossing-body 1 is 290 m, the maximum range of the controllable variable spray gun is 60 m, the total area of the square land parcel is 336,400 m$^2$, the area irrigated by the sprinkler crossing-body 1 is 264,208 m$^2$, the land utilization without controllable variable spray gun is 78.54% and when the controllable variable spray gun operates synchronously, the irrigation area is increased by 56,770 m$^2$ and the land utilization is increased by 16.88%.

The control system of this invention issues commands and instructions to the spray gun based on time signal and position signal of the sprinkler crossing-body 1, and the spray gun variable cross-section drive motor 9 and the spray gun rotating motor 14-2 act accordingly to spray the required amount of water in the specified area. The water flow sprayed out of the nozzle 12 is influenced by the rotating water allocation slice 13. By adjusting the revolving speed of the water allocation lever drive motor 8, the time of the water allocation slice 13 influencing on the water flow is controlled, so as to make the water flow of the nozzle 12 evenly scattered within the range, thereby ensuring the irrigation uniformity of the land corners.

Taking the angle of the sprinkler crossing-body 1 as 0° when the sprinkler crossing-body 1 is vertical with any border line of the square land parcel, when the sprinkler crossing-body 1 rotates counterclockwise and the angle changes from 0° to 90°, the angle between the spray gun main body 2 and the sprinkler crossing-body 1 gradually changes from 90° to 180°. At the same time, the cross-sectional area of the nozzle 12 is gradually increased from 0 to the maximum cross-sectional area of pre-installed nozzle. When the sprinkler crossing-body 1 changes from 90° to 180°, the angle between the spray gun main body 2 and the sprinkler crossing-body 1 gradually changes from 180° to 90°, and at the same time, the spray gun variable cross-section drive motor 9 adjusts the cross-sectional area of the nozzle 12 as gradually reducing from the maximum cross-sectional area of pre-installed nozzle to 0, and the rough orientation of the controllable spray gun main body 2 is always adjacent the land corners of the land parcel.

INDUSTRIAL PRACTICABILITY

This inventive device, installed on the tail end of the central-pivot sprinkler, automatically operates synchronously along with the operation of the sprinkler. When the central-pivot sprinkler operates and arrives to different positions, the spraying angle of the spray gun main body can be automatically adjusted by the preset program, so that four land corner areas of the square land parcel which the sprinkler's irrigation is missed can be evenly irrigated, thereby improving the land utilization without affecting physiognomy surrounding the land parcel. This invention achieves the purpose of adjusting spraying area and flow amount by adjusting the cross-sectional area of the nozzle and the spay flow's horizontal included angle with the sprinkler pipeline, resulting in high uniformity of irrigation, reduced material cost and operating cost, saved man power and material resources and an increased irrigation area by 16% in square land parcel by the central-pivot sprinkler.

Although this invention has been described with references to several embodiments, it should be understood that, the terms used are illustrative, exemplary and nonrestrictive terms. Because this invention can be implemented in multiple forms without departing from the spirit or substance of the invention, it should be understood that, the above embodiments are not limited to any of the foregoing details; rather, they should be widely explained within the spirit and scope of the appended claims. Therefore, all modifications and variations within the scope of the claims or equivalents should be covered by the appended claims.

The invention claimed is:

1. A controllable variable spray gun, comprising:
a spray gun main body (2), a booster pump (7), and a spray gun connecting pipe (16), wherein a water inlet of the booster pump (7) is connectable with a sprinkler pipeline (15) of a central-pivot sprinkler, a water outlet of the booster pump (7) is connected with a water inlet of the spray gun main body (2) via the spray gun connecting pipe (16),
wherein a forepart of the spray gun main body (2) is provided with a nozzle (12) and a tail portion of the spray gun main body (2) is adapted to be installed on an end of a central-pivot sprinkler crossing-body (1) via a spray gun horizontal-rotation mechanism (14),
wherein the spray gun horizontal-rotation mechanism (14) comprises a hollow base (14-5), a worm wheel (14-4), a worm (14-3), a spray gun rotating motor (14-2) and a standpipe (14-1),
the hollow base (14-5) is affixed to a water outlet of the spray gun connecting pipe (16) and the two are seamlessly connected, the standpipe (14-1) is arranged into the hollow base (14-5), and an upper port of the standpipe (14-1) is connected with the water inlet of the spray gun main body (2),
the worm wheel (14-4) is arranged between the standpipe (14-1) and the hollow base (14-5), and an outer wall of the standpipe (14-1) and an inner wall of the worm wheel (14-4) are fixedly connected, the worm wheel (14-4) engages the worm (14-3) via a pass groove arranged on a wall of the hollow base (14-5) and the worm (14-3) is fixedly connected with a rotation shaft of the spray gun rotating motor (14-2).

2. The controllable variable spray gun of claim 1, wherein the spray gun main body (2) is arranged to be upward tilted and the nozzle (12) faces the outward side of the sprinkler crossing-body (1).

3. The controllable variable spray gun of claim 2, wherein the upper side of the tail portion of the spray gun main body (2) is fixedly arranged with a water allocation lever drive motor (8), the rotation shaft of the water allocation lever drive motor (8) is fixedly connected with the tail portion of a water allocation lever (10) arranged on the upper side of the spray gun main body (2) and the forepart of the water allocation lever (10) is arranged with a water allocation slice (13) facing the nozzle (12).

4. The controllable variable spray gun of claim 1, wherein the tail portion of the spray gun main body (2) is fixedly arranged with a spray gun variable cross-section drive motor (9), the rotation shaft of the spray gun variable cross-section drive motor (9) is fixedly connected with the tail portion of the variable section adjusting lever (11) running through the center of the spray gun main body (2), the head of the variable cross-section adjusting lever (11) is of a tapering cone and the head of the cone is insertable into the water outlet of the nozzle (12).

5. The controllable variable spray gun of claim 4, wherein the upper side of the tail portion of the spray gun main body (2) is fixedly arranged with a water allocation lever drive motor (8), the rotation shaft of the water allocation lever drive motor (8) is fixedly connected with the tail portion of a water allocation lever (10) arranged on the upper side of the spray gun main body (2) and the forepart of the water allocation lever (10) is arranged with a water allocation slice (13) facing the nozzle (12).

6. A central-pivot sprinkler comprising a central pivot (3) and a central-pivot sprinkler crossing-body (1), one end of the central-pivot sprinkler crossing-body (1) is reelingly installed on the central pivot (3), wherein the central-pivot sprinkler further comprises a controllable variable spray gun installed on an other end of the central-pivot sprinkler crossing-body (1), wherein the controllable variable spray gun comprises:
a spray gun main body (2), a booster pump (7), and a spray gun connecting pipe (16),
wherein a water inlet of the booster pump (7) is connected with a sprinkler pipeline (15) of the central-pivot sprinkler, a water outlet of the booster pump (7) is connected with a water inlet of the spray gun main body (2) via the spray gun connecting pipe (16),
wherein a forepart of the spray gun main body (2) is provided with a nozzle (12) and a tail portion of the spray gun main body (2) is installed on the other end of a central-pivot sprinkler crossing-body (1) via a spray gun horizontal-rotation mechanism (14), wherein the spray gun horizontal-rotation mechanism (14) comprises a hollow base (14-5), a worm wheel (14-4), a worm (14-3), a spray gun rotating motor (14-2) and a standpipe (14-1), the hollow base (14-5) is affixed to a water outlet of the spray gun connecting pipe (16) and the two are seamlessly connected, the standpipe (14-1) is arranged into the hollow base (14-5), and an upper port of the standpipe (14-1) is connected with the water inlet of the spray gun main body (2), the worm wheel (14-4) is arranged between the standpipe (14-1) and the hollow base (14-5), and an outer wall of the standpipe (14-1) and an inner wall of the worm wheel (14-4) are fixedly connected, the worm wheel (14-4) engages the worm (14-3) via a pass groove arranged on a wall of the hollow base (14-5) and the worm (14-3) is fixedly connected with a rotation shaft of the spray gun rotating motor (14-2).

7. The central-pivot sprinkler of claim 6, further comprising a control system, wherein the control system issues commands to the controllable variable spray gun of the central-pivot sprinkler based on a time signal and a position signal of the sprinkler crossing-body (1) to cause the spray gun variable cross-section drive motor (9) and the spray gun rotating motor (14-2) to spray out a pre-determined amount of water in a specified area.

8. The central-pivot sprinkler of claim 6, wherein, in the controllable variable spray gun, the spray gun main body (2) is arranged to be upward tilted and the nozzle (12) faces the outward side of the sprinkler crossing-body (1).

9. The central-pivot sprinkler of claim 8, wherein, in the controllable variable spray gun, the upper side of the tail portion of the spray gun main body (2) is fixedly arranged with a water allocation lever drive motor (8), the rotation shaft of the water allocation lever drive motor (8) is fixedly connected with the tail portion of a water allocation lever (10) arranged on the upper side of the spray gun main body (2) and the forepart of the water allocation lever (10) is arranged with a water allocation slice (13) facing the nozzle (12).

10. The central-pivot sprinkler of claim 6, wherein, in the controllable variable spray gun, the tail portion of the spray gun main body (2) is fixedly arranged with a spray gun variable cross-section drive motor (9), the rotation shaft of the spray gun variable cross-section drive motor (9) is fixedly connected with the tail portion of the variable section adjusting lever (11) running through the center of the spray gun main body (2), the head of the variable cross-section adjusting lever (11) is of a tapering cone and the head of the cone can be inserted into the water outlet of the nozzle (12).

11. The central-pivot sprinkler of claim 10, wherein, in the controllable variable spray gun, the upper side of the tail portion of the spray gun main body (2) is fixedly arranged with a water allocation lever drive motor (8), the rotation shaft of the water allocation lever drive motor (8) is fixedly connected with the tail portion of a water allocation lever (10) arranged on the upper side of the spray gun main body (2) and the forepart of the water allocation lever (10) is arranged with a water allocation slice (13) facing the nozzle (12).

* * * * *